Patented Oct. 13, 1942

2,298,354

UNITED STATES PATENT OFFICE 2,298,354

MANUFACTURE OF ACETIC ANHYDRIDE

Henry Dreyfus, London, England, assignor to Celanese Corporation of America, a corporation of Delaware No Drawing. Application December 29, 1938, Serial No. 248,206. In Great Britain February 10, 1938

6 Claims. (Cl. 260—546)

This invention relates to the manufacture of acetic anhydride.

The oxidation of acetaldehyde is a process which has been widely employed in the manufacture of acetic acid, although it is known that acetic anhydride is also produced in the process, probably as an intermediate product. However, while in the manufacture of acetic acid, recovery in a pure form of the acetic acid offers no difficulty, when the manufacture of acetic anhydride is attempted a serious difficulty is met with, namely the tendency of the anhydride formed to be hydrolysed by the water simultaneously produced. Efficient methods of separating vaporous mixtures of acetic anhydride and water, such as are produced by the thermal dehydration of acetic acid, are very well known, but, while at first sight it would seem natural to apply these methods to the separation of mixtures of acetic anhydride and water produced by oxidising acetaldehyde, it is found in practice that the problem is not adequately solved by these methods. This is because the separation processes involve evaporation of the liquid mixture containing acetic anhydride and water and during this evaporation step a considerable quantity of the acetic anhydride is hydrolysed.

Yields of anhydride in the oxidation of acetaldehyde can be improved by the presence in the reaction medium of certain organic liquids, in particular, liquids which dissolve acetic anhydride but which do not dissolve and are not soluble in water to any considerable extent.

According to the present invention the oxidation of acetaldehyde is effected in the presence of aliphatic hydrocarbons.

As the hydrocarbons there may be employed petroleum fractions such as benzine, petroleum fractions boiling at higher temperatures, e. g. up to 150° or 200° C., and individual aliphatic hydrocarbons, e. g. the pentanes and hexanes. The amount of hydrocarbons should be sufficient to produce a separate, and preferably a continuous, non-aqueous phase.

The use of the aliphatic hydrocarbons in this way offers a number of advantages in the manufacture of acetic anhydride by oxidizing acetaldehyde. For instance, one result of their use is that the water produced in the oxidation forms and is maintained in a phase separate from the anhydride produced, and this considerably reduces the loss by hydrolysis of anhydride while the oxidation is proceeding. Furthermore, it is possible to operate the process continuously; thus, the anhydride and hydrocarbon mixture may be run off from the reaction zone continuously or at intervals, separated from the aqueous phase and fractionally distilled to separate the anhydride and hydrocarbons, the latter then being returned to the reaction zone. The separation of the hydrocarbon and aqueous phases may be effected before or after the anhydride and hydrocarbon mixture leaves the reaction zone; or part of the aqueous phase may be separated before and part after the mixture leaves the reaction zone. When part or all of the aqueous phase is separated from the hydrocarbon phase inside the reaction zone, it may be separately removed from the reaction zone continuously or at intervals. Fresh acetaldehyde may be supplied continuously or at intervals.

Generally speaking, the process may be carried out in either of two ways. In the first air or other oxidising gas may be led into a mixture of acetaldehyde and the hydrocarbons under the desired temperature and pressure conditions. In the second, the acetaldehyde in vapour or liquid form may be fed in admixture with, or separately from but simultaneously with, the oxidising gas into the hydrocarbons at the desired temperature and pressure. Usually, this second method is to be preferred to the first, as it gives a better yield of anhydride and enables the reaction to be more readily controlled.

The reaction conditions preferably employed are similar in the two methods, and are such as give rise to active and rapid oxidation of the acetaldehyde. Suspended or preferably dissolved in the hydrocarbons there may be an active oxidation catalyst, e. g. a copper, cobalt or nickel salt or mixtures of salts of any two or all three of these metals. Manganese catalysts may be used if desired, but as they are less active, they are preferably employed, if at all, with salts of one or more of the other three metals. The metals may, for example, be present in the form of their acetates, but it is advantageous to employ salts which are more soluble in the hydrocarbons; thus, the metals may be in the form of salts of long chain aliphatic acids, e. g. as oleates, stearates or linoleates. A useful mixed catalyst consists of a mixture of cobalt and copper salts of long chain aliphatic acids in which the cobalt: copper ratio is between about 3:2 and 2:1.

Preferably the oxidation is carried out under superatmospheric pressures both with a view to preventing vaporisation of the acetaldehyde and in order to promote the oxidation reaction; for instance gauge pressures of 25–65 lbs. per square inch may be used; the higher pressures, e. g. pressures of 55–65 lbs. per square inch, are preferably employed when the oxidising gas is a diluted oxygen, for example air, and the lower pressures, e. g. 25–35 lbs. per square inch, when undiluted oxygen is used. Similarly, although the reaction can, in general, be carried out efficiently over a range of temperatures of about 35-75° C. and even lower temperatures may be employed, it is preferred to use the higher temperatures in the range when using a diluted oxygen, for example air.

When working under suitable conditions of temperature and pressure, having regard to the boiling point of the hydrocarbons employed, provision may be made for the removal by evaporation of some of the hydrocarbons during the oxidation; when this is done some water is entrained and thus removed from the reaction zone. This expedient is of special value when the oxidising gas is diluted oxygen, e. g. a gas mixture containing oxygen and for example 5, 10, 20 or 30 times its own volume of an inert diluent gas, for instance nitrogen, carbon dioxide, gaseous hydrocarbons such as methane or mixtures thereof. The diluent gas assists very considerably in the evaporation and removal of the hydrocarbons with entrained water vapour. Hydrocarbons so removed may, after being separated from the entrained water, be returned to the process.

Similarly, when carrying out the oxidation as a batch process, part or all of the water may be removed by using the hydrocarbons as an entraining liquor at the close of the oxidation. The evaporation may be aided by the passage of oxidising and/or inert gases.

Whether the acetaldehyde is already present mixed with the hydrocarbons or is added in vapour or liquid form together or simultaneously with the oxidising gas, the latter is preferably fed into the hydrocarbons in such a manner as to produce an intimate mixture of gas, acetaldehyde and hydrocarbons. For example, the oxidising gas may be forced through a rose or a set of fine jets, so as to produce a cloud of small bubbles in the hydrocarbons. If the acetaldehyde is introduced in the form of vapour or liquid, it also may be caused to form fine bubbles or droplets.

Another very effective method consists in carrying out the oxidation in a series of narrow tubes, using a rapid current of oxidising gas so as to cause the hydrocarbon to froth in the tubes; the acetaldehyde may be initially present in admixture with the hydrocarbons or may be introduced together or simultaneously with the oxidising gas.

As indicated above, the oxidation can, with advantage, be carried out as a continuous process, and the oxidation using narrow tubes is preferably so performed. Thus, whether or not a part of the hydrocarbon liquor is evaporated during the oxidation so as to remove part or all of the water, the contents of the tubes may be run off at intervals or continuously and allowed to separate into two layers. The hydrocarbon layer may then be distilled to recover the anhydride produced, and the hydrocarbon returned to the process.

The following examples illustrate the invention without limiting it in any way.

Example 1

Equal weights of acetaldehyde and benzine containing 0.2% (on the weight of the mixture) of copper oleate are heated in an autoclave, under a gauge pressure of 60 lbs. to a temperature of about 65° C. Into the heated mixture air is forced in the form of fine bubbles. As the reaction proceeds the contents of the autoclave separate into an aqueous phase containing acetic acid, and a hydrocarbon phase containing acetic anhydride as well as some acetic acid.

After the oxidation these two phases are allowed to separate into two layers. From the hydrocarbon layer acetic anhydride is recovered by distillation, and the benzine (with any acetic acid it may contain) is returned to serve in the oxidation of a further batch of acetaldehyde.

Example 2

A petroleum fraction boiling between about 80° and 110° C. mixed with twice its volume of acetaldehyde, is passed slowly upwards through a number of narrow tubes arranged in parallel. Dissolved in the hydrocarbon-acetaldehyde mixture is about 0.2% of copper oleate. Air is forced into the lower end of each tube and escapes at the upper end through a liquid trap. The tubes are heated to 60–65° C., and the pressure is kept at about 65 lbs. Towards the upper end of each tube is a liquid overflow where the petroleum fraction and the other liquids present escape. The rate of flow of the liquid through the tubes is so adjusted that the liquid leaving the tubes contains not more than 10% of the initial quantity of acetaldehyde.

The liquid leaving the tube comprises a hydrocarbon phase and an aqueous phase. These are allowed to separate. The hydrocarbon phase is separated by fractional distillation into hydrocarbon (which may contain some acetic acid) and acetic anhydride. The hydrocarbon, with acetic acid contained therein, is returned to the process.

Example 3

Benzine containing copper oleate is caused to flow slowly through a set of narrow tubes as described in Example 2, and under the same conditions. At the same time a mixture of 75 parts by volume of air and 25 parts of acetaldehyde vapour is fed into the tubes and passed through the benzine. Unreacted acetaldehyde may be removed from the spent air by condensation, and acetic anhydride and benzine are recovered as described in Example 2.

Having described my invention, what I desire to secure by Letters Patent is:

1. Process for the manufacture of acetic anhydride, which comprises subjecting acetaldehyde to oxidation by means of free oxygen in the presence of sufficient of a liquid aliphatic hydrocarbon to form a non-aqueous phase containing acetic anhydride, separating said non-aqueous phase from the aqueous phase simultaneously produced, and recovering acetic anhydride from the non-aqueous phase by distillation.

2. Process for the manufacture of acetic anhydride, which comprises subjecting acetaldehyde to oxidation by means of free oxygen in the presence of a catalyst and sufficient of a liquid aliphatic hydrocarbon to form a non-aqueous phase containing acetic anhydride, separating said non-aqueous phase from the aqueous phase simultaneously produced, and recovering acetic anhydride from the non-aqueous phase by distillation.

3. Process for the manufacture of acetic anhydride, which comprises subjecting acetaldehyde to oxidation by means of free oxygen in the presence of a copper salt as catalyst and sufficient of a liquid aliphatic hydrocarbon to form a non-aqueous phase containing acetic anhydride, separating said non-aqueous phase from the aqueous phase simultaneously produced, and recovering acetic anhydride from the non-aqueous phase by distillation.

4. Process for the manufacture of acetic anhydride, which comprises subjecting acetaldehyde to oxidation by means of free oxygen in the presence of a cobalt salt as catalyst and sufficient of a liquid aliphatic hydrocarbon to form a non-aqueous phase containing acetic anhydride, separating said non-aqueous phase from the aqueous phase simultaneously produced, and recovering acetic anhydride from the non-aqueous phase by distillation.

5. Process for the manufacture of acetic anhydride, which comprises subjecting acetaldehyde to oxidation by means of free oxygen in the presence of a nickel salt as catalyst and sufficient of a liquid aliphatic hydrocarbon to form a non-aqueous phase containing acetic anhydride, separating said non-aqueous phase from the aqueous phase simultaneously produced, and recovering acetic anhydride from the non-aqueous phase by distillation.

6. Process for the manufacture of acetic anhydride, which comprises subjecting acetaldehyde to oxidation by means of free oxygen in the presence of a catalyst comprising a higher fatty acid salt of a catalytic metal and sufficient of a liquid aliphatic hydrocarbon to form a non-aqueous phase containing acetic anhydride, separating said non-aqueous phase from the aqueous phase simultaneously produced, and recovering acetic anhydride from the non-aqueous phase by distillation.

HENRY DREYFUS.